UNITED STATES PATENT OFFICE.

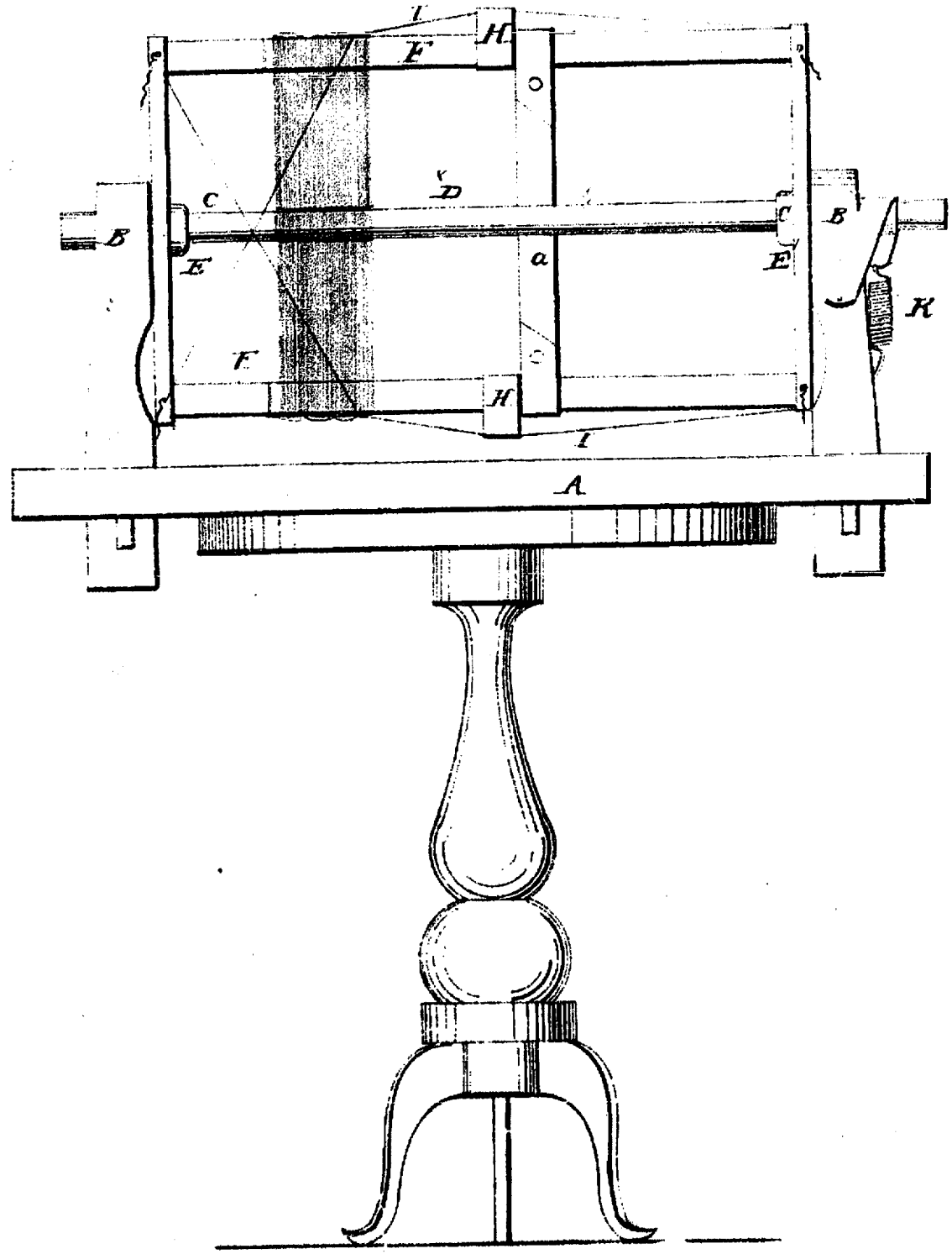

JOHN BLACKMAR, OF BROOKLYN, CONNECTICUT.

CONSTRUCTION OF WEAVERS' HARNESS.

Specification of Letters Patent No. 64, dated October 20, 1836.

*To all whom it may concern:*

Be it known that I, JOHN BLACKMAR, of Brooklyn, in the county of Windham and State of Connecticut, have invented a new and useful Improvement in the Construction of Weavers' Harness, and the following is a full and exact description of the same.

The harness is made of such twine as is ordinarily used in making harnesses, the improvement is principally in what are called the eyes of the harness or that part through which the warp of the web passes, and by which it is moved up and down in springing the web, and consists in making a whole shade or part with one continuous twine, and constructing a knot at the lower end of the eye, instead of having the lower end of the eye a loop, and instead of connecting the eye with the lower shaft by a loop going through the eye as in the common harness. To specify, describe, and explain the improvement, and the manner of constructing the improved harness, it will be necessary to suppose the maker of the harness seated at a harness bench, like the one in common use—let the harness shafts with binding be put in the frame as usual, let the shaft next to the maker be called the first or lower shaft (as it will be the lower shaft, when the harness is finished, and in use) and the other shaft the second or upper shaft—let the twine of which the harness is to be constructed to be put on the harness needle as usual. Begin to construct the harness at the left hand—after fastening the twine to the binding twine on the first shaft, pass the needle under the first shaft, and the rod, and the second shaft to the binding twine of the second shaft, fasten it there as in common harnesses then bring it under this shaft to the rod, let it lie directly above the twine already placed, tie the upper and lower twine together by some suitable knot on the side of the rod nearest the second shaft, then bring the twine over the rod to the side of it next to the first, and then connect the upper, and lower twine again in like manner, or with a double knot, thus forming the eye, on the rod, with a knot in each end of the eye, then carry the twine across the top of the first shaft onto the binding twine of the first shaft, where you began, fasten it, and then proceed to make a second gavil (if it may be so called) by passing the needle under the first shaft, and rod to the top of the second shaft (instead of carrying it under the second as in the first gavil) fasten the twine as before, bring it back to the rod and form the eye, as in the first gavil, then connect the twine with the binding twine on the first shaft as before, thus proceeding to construct the gavils alternately, like the first, and second, above described till the requisite number of gavels are completed.

The first mentioned knot (*i. e.*) the knot lying on the rod between the rod, and the second shaft may be made thus; when the twine is brought under the second shaft to the rod as before described let it lap on it a little, hold it to the rod with the thumb, and finger, let a loop from the twine on the needle fall on the left hand of the twine already placed, and between the rod, and second shaft, then pass the needle on the right side of the twines placed as aforesaid, and under them, and up on the left hand of them, and within the loop aforesaid, then draw the hitch or knot close, and proceed to make the knot on the other end of the eye, thus, carry the loose twine (*i. e.*) the twine proceeding immediately from the needle) a little to the left of the under twine which extends from the rod to the first shaft, pass the needle down at the right hand of, and under said last mentioned twine, bring it up between that, and the loose twine, and draw the knot or hitch thus formed close to the rod, hold it there with the thumb, and repeat the process thus forming the double knot, or double hitch required.

What I claim as new, and my own invention in the construction of the harness is—

The double knot or double hitch, or any other close knot which may answer the purpose at the lower end of the eye, where loops have heretofore been used; in the common harness in the operation of springing the web this loop is liable to work, or slip in the eye, and thus fret out the twine of the eye, or loop before the rest of the harness is worn out.

The object of fastening the eye at both ends was to avoid this difficulty, and for this the above improvement is designed. For conveniency, and accuracy in making the harness the rod may be flattened like a letter knife. The knots should be made as accurately, and uniformly as possible on the line of the edges.

To give an idea of the construction of the improved harness it has been deemed sufficient to explain the process of constructing it upon a common harness-bench, as it may be made upon such a bench, but to facilitate the process so that the expense of the harness may be materially diminished, and the
5 improvement thereby rendered more beneficial to the public. A bench adapted to the peculiar construction of this harness has been invented by the undersigned which he has made the subject of a distinct application for a patent.

JOHN BLACKMAR.

Witnesses:
 THOMAS BACKUS,
 DANIEL P. TYLER.